US009952561B2

(12) United States Patent
Sekitsuka et al.

(10) Patent No.: US 9,952,561 B2
(45) Date of Patent: Apr. 24, 2018

(54) RADIO TIMEPIECE, METHOD FOR ACQUIRING LEAP SECOND CORRECTION INFORMATION AND RECORDING MEDIUM

(71) Applicant: CASIO COMPUTER CO., LTD., Tokyo (JP)

(72) Inventors: Tatsuya Sekitsuka, Kunitachi (JP); Takeshi Matsue, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/389,515

(22) Filed: Dec. 23, 2016

(65) Prior Publication Data

US 2017/0277141 A1    Sep. 28, 2017

(30) Foreign Application Priority Data

Mar. 24, 2016    (JP) ................................ 2016-059454

(51) Int. Cl.
*G04C 11/00* (2006.01)
*G04R 20/06* (2013.01)
*H04B 10/118* (2013.01)

(52) U.S. Cl.
CPC .............. *G04R 20/06* (2013.01); *G04C 11/02* (2013.01); *H04B 10/118* (2013.01)

(58) Field of Classification Search
CPC ........ G04R 20/06; H04B 10/118; G04G 5/00; G04G 7/00; G04C 11/00; G04C 11/02
See application file for complete search history.

(56) References Cited

U.S. PATENT DOCUMENTS

| 7,813,225 | B2 * | 10/2010 | Urano | ................... | G04R 20/16 368/47 |
| 2008/0165624 | A1 * | 7/2008 | Urano | ................... | G04R 20/18 368/47 |
| 2008/0165626 | A1 * | 7/2008 | Urano | ................... | G04R 20/18 368/47 |
| 2008/0165627 | A1 * | 7/2008 | Urano | ................... | G04R 20/18 368/47 |
| 2008/0165628 | A1 * | 7/2008 | Urano | ................... | G04R 20/18 368/47 |

FOREIGN PATENT DOCUMENTS

JP          2009-250801 A      10/2009

* cited by examiner

*Primary Examiner* — Sean Kayes
(74) *Attorney, Agent, or Firm* — Scully, Scott, Murphy & Presser, P.C.

(57) ABSTRACT

A radio timepiece, including: a satellite radio wave receiver; a ground wave receiver; a memory; and a controller, wherein the controller performs area determination operation of determining whether a current position is located within a geographical range where the ground wave receiver is capable of acquiring notice information regarding implementation/non-implementation of the leap second adjustment, when the controller determines that the current position is located within the geographical range, the controller controls the ground wave receiver to acquire the notice information, the controller determines, with the notice information, whether the leap second adjustment is scheduled to be implemented at an implementation candidate timing of the leap second adjustment, and when the controller determines that the leap second adjustment is scheduled to be implemented, the controller changes the leap second correction information at or after the implementation candidate timing.

20 Claims, 5 Drawing Sheets

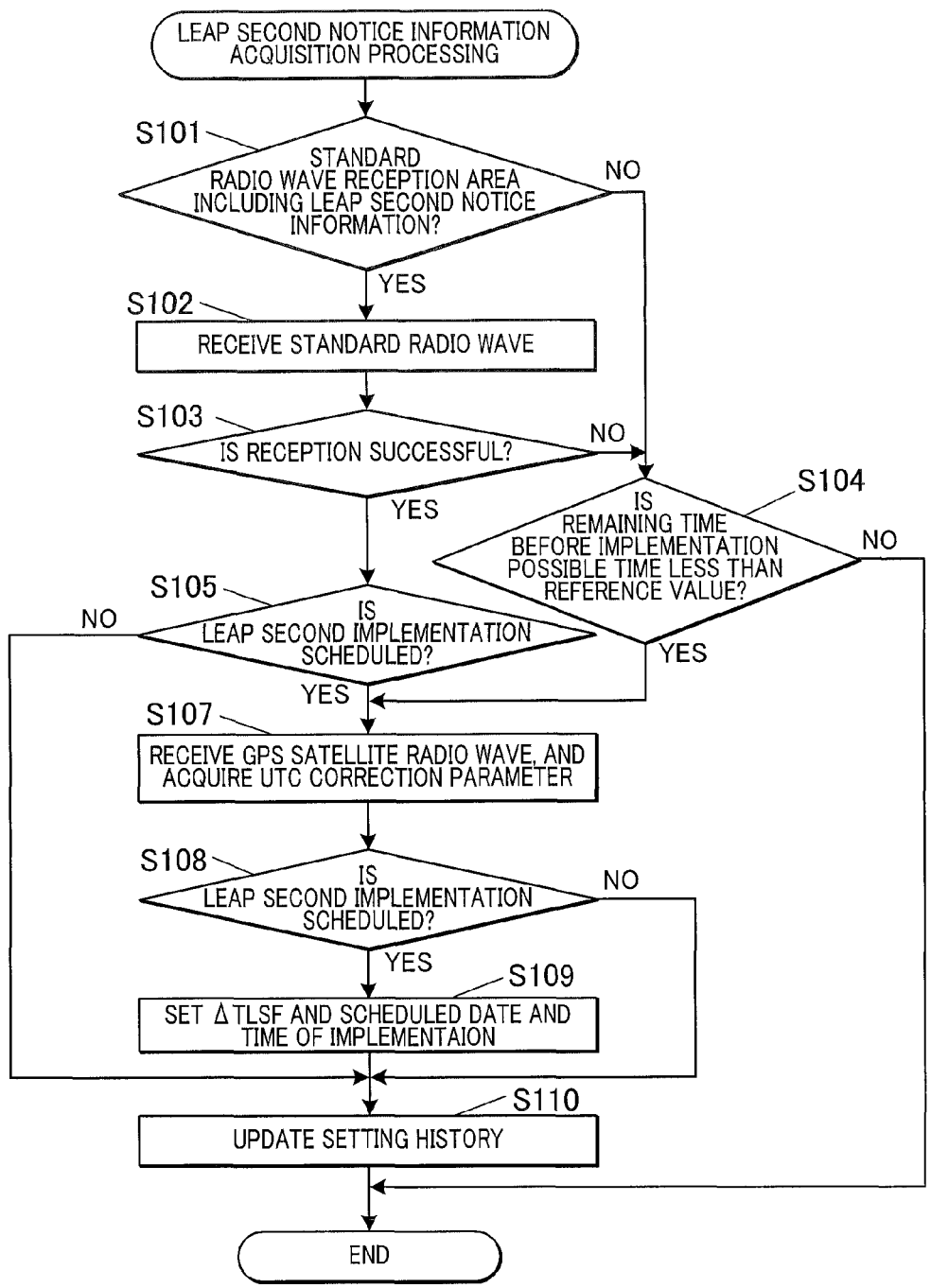

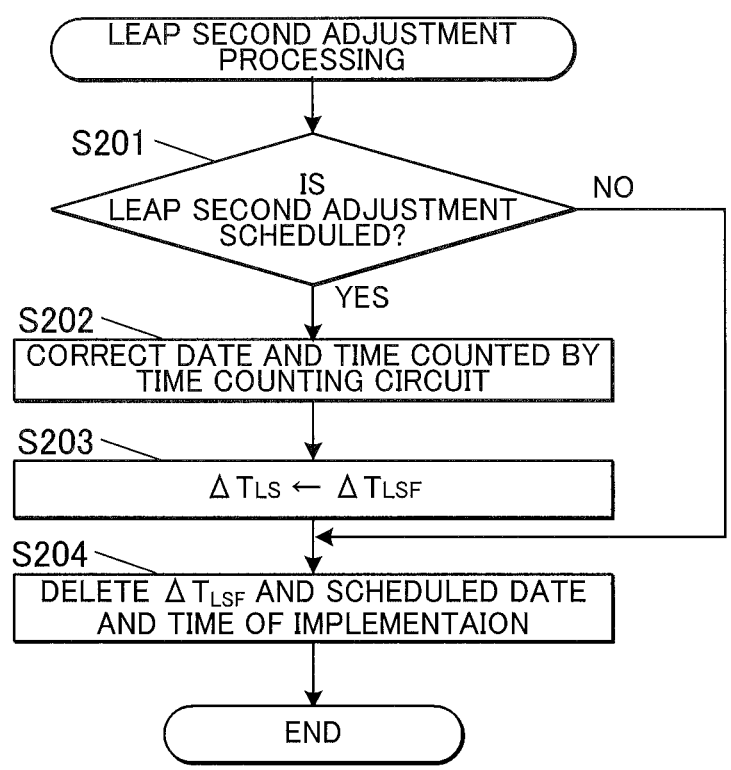

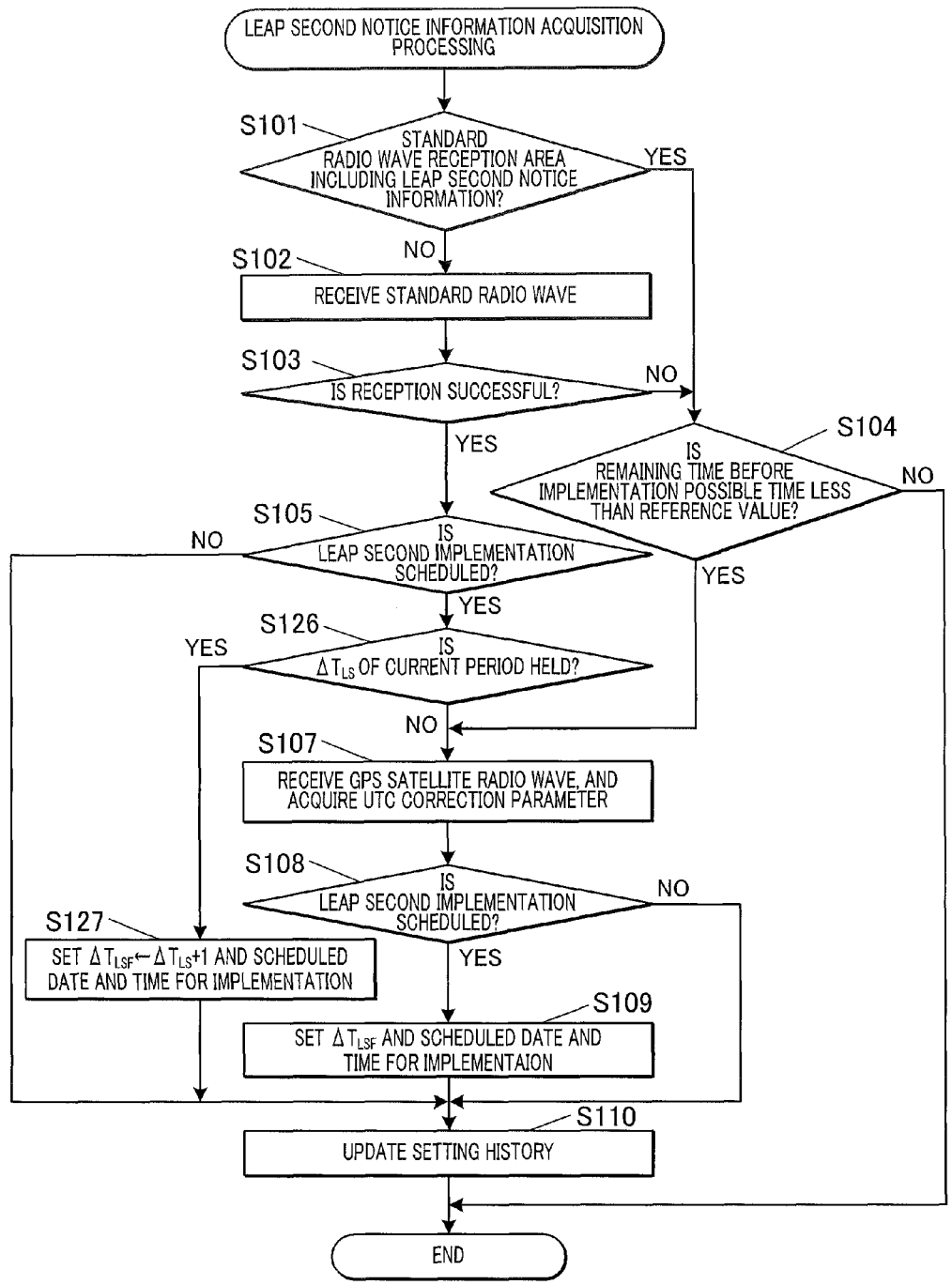

US 9,952,561 B2

RADIO TIMEPIECE, METHOD FOR ACQUIRING LEAP SECOND CORRECTION INFORMATION AND RECORDING MEDIUM

BACKGROUND OF THE INVENTION

1. Field of the Invention

The present invention relates to a radio timepiece, a method for acquiring leap second correction information of the radio timepiece and a recording medium.

2. Description of Related Art

There have been conventionally electronic timepieces (radio timepieces) which have a function of obtaining accurate date and time information by receiving radio waves including date and time information from outside, and correcting date and time counted by an internal timepiece to maintain the accurate date and time. As a radio wave which does not require radio wave transmission from the radio timepieces among the above radio waves from outside which are the targets to be received by the radio timepieces, there have been widely used a transmission radio wave from a positioning satellite according to a GNSS (Global Navigation Satellite System) and a standard radio wave for transmitting time information in a low frequency band. For several areas in the world, the standard radio waves containing date and time information corresponding to the respective areas are transmitted in their original formats in the respective areas as transmission areas. As for the radio wave from a positioning satellite, the radio wave in a format corresponding to the positioning system is transmitted from a satellite orbit, and the radio wave can be received over the entire area in the world which can be viewed from above. Thus, in recent years, radio timepieces correcting date and time by receiving radio waves from positioning satellites have been increased.

Currently, the date and time used in the world is irregularly subjected to leap second adjustment at a part of predetermined candidate timings (leap second adjustment possible timings). The leap second adjustment is a one-second adjustment which is performed on the basis of a difference between the International Atomic Time and the Earth's rotation period. The implementation of leap second is generally reflected in real time on many of the above date and times which are transmitted via radio waves from outside. However, in the positioning satellite (GPS satellite) according to the GPS (Global Positioning System) in the US and GPS complementary satellites such as a positioning satellite (QZSS satellite) according to Quasi Zenith Satellite System in Japan, the leap second adjustment is not reflected on the date and time which is counted by a timepiece (satellite timepiece) mounted on the positioning satellite and transmitted. Thus, a UTC correction parameter which is time difference information between the satellite timepiece and the UTC (Coordinate Universal Time) is transmitted separately from the date and time. Accordingly, in order to acquire accurate UTC date and time and other local times in a radio timepiece which corrects date and time by receiving a radio wave from a GPS satellite, it has been conventionally necessary to acquire the UTC correction parameter and perform correction at least once at each of the leap second adjustment possible timings in addition to obtain the date and time counted by the satellite timepiece.

However, the transmission frequency of the UTC correction parameter from the GPS satellite is once every 12.5 minutes, and the transmission frequency from the QZSS satellite is irregular and currently a maximum of once every 5 minutes. Thus, the frequencies have very long intervals compared to the radio wave receiving time from the GPS satellite at the general date and time information acquisition. The radio timepiece uses a light and compact battery in consideration of weight and size. The power consumption required for receiving a radio wave from the positioning satellite is remarkably large compared to the power consumption required for general time counting operation and time display operation. Thus, there is a problem that the power consumption of battery excessively increases and has a bad influence on the general operation and battery when the radio wave reception is arbitrarily started and continued until the UTC correction parameter is acquired. With respect to the problem, as a technique for reducing power consumption when acquiring the time difference information regarding leap second, a Japanese patent document Japanese Patent Application Laid Open Publication No. 2009-250801 discloses a technique in which, upon reception for acquiring general date and time information, the time interval until the transmission timing of the UTC correction parameter is calculated from the received contents, the reception is once interrupted, and the reception is restarted immediately before the transmission timing of the UTC correction parameter.

However, the frequency of leap second adjustment which is actually performed is not very high compared to the leap second adjustment possible timings. Thus, if notice information regarding implementation/non-implementation of leap second adjustment and a correction value are acquired from the positioning satellite at each of the leap second adjustment possible timings, the acquisition itself leads to the increase in power consumption, which is not efficient.

SUMMARY OF THE INVENTION

An object of the present invention is to provide a radio timepiece, a method for acquiring leap second correction information and a recording medium which can appropriately reflect the implementation of leap second adjustment and count date and time more efficiently.

In order to solve the above object, there is provided a radio timepiece, including: a satellite radio wave receiver which receives a radio wave from a positioning satellite; a ground wave receiver which receives a radio wave in a low frequency band; a memory which stores leap second correction information regarding a time difference between counted date and time of the positioning satellite and UTC date and time, the time difference being generated by implementation of leap second adjustment; and a controller, wherein the controller performs area determination operation of determining whether a current position is located within a geographical range where the ground wave receiver is capable of acquiring notice information regarding implementation/non-implementation of the leap second adjustment, when the controller determines that the current position is located within the geographical range where the ground wave receiver is capable of acquiring the notice information, the controller controls the ground wave receiver to acquire the notice information of the leap second adjustment, the controller determines, with the notice information, whether the leap second adjustment is scheduled to be implemented at an implementation candidate timing of the leap second adjustment, and when the controller determines that the leap second adjustment is scheduled to be implemented, the controller changes the leap second correction information at or after the implementation candidate timing of the leap second adjustment.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 3 is a flow chart showing a control procedure of leap second notice information acquisition processing executed in a radio timepiece of a first embodiment;

FIG. 4 is a flow chart showing a control procedure of leap second adjustment processing executed in the radio timepiece of the first embodiment; and FIG. 5 is a flow chart showing a control procedure of the leap second notice information acquisition processing executed in a radio timepiece of a second embodiment.

DETAILED DESCRIPTION OF THE PREFERRED EMBODIMENT

Hereinafter, embodiments of the present invention will be described with reference to the drawings.

First Embodiment

Figure 1:
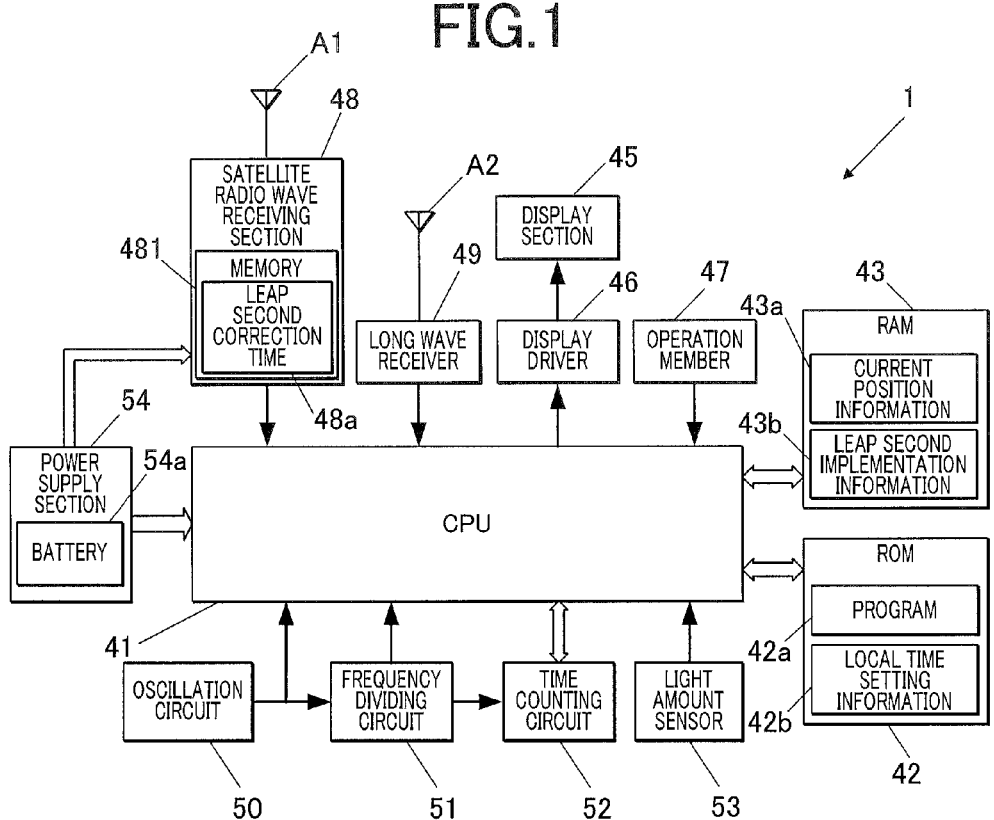
FIG. 1 is a block diagram showing a functional configuration of a radio timepiece in an embodiment of the present invention.

FIG. 1 is a block diagram showing a functional configuration of a radio timepiece in a first embodiment of the present invention.

The radio timepiece 1 in the first embodiment is a portable electronic timepiece (computer), and an electronic wristwatch, for example.

The radio timepiece 1 includes a CPU (Central Processing Unit) 41 (controller), a ROM (Read Only Memory) 42, a RAM (Random Access Memory) 43, a display section 45, a display driver 46 thereof, an operation member 47, an oscillation circuit 50, a frequency dividing circuit 51, a time counting circuit 52, a satellite radio wave receiving section 48 (satellite radio wave receiver), an antenna A1 thereof, a long wave receiver 49 (ground wave receiver), an antenna A2 thereof, a light amount sensor 53, a power supply section 54 and such like.

The CPU 41 is a processor which performs various types of calculation and integrally controls the entire operation of the radio timepiece 1. On the basis of date and time data acquired from the satellite radio wave receiving section 48 and date and time data acquired by reading a signal input from the long wave receiver 49, the CPU 41 transmits a signal to the time counting circuit 52 and corrects the date and time data held in the time counting circuit 52. In a case where the RAM 43 stores schedule information regarding the start and end of summer time and notice information regarding insertion or deletion of leap second (leap second adjustment), the CPU 41 reflects the notice information on the leap second setting information and the date and time counted by the time counting circuit 52 at the scheduled implementation timing.

The ROM 42 stores various programs and setting data for performing various operations in the radio timepiece 1. The programs stored in the ROM 42 include a program 42a used for managing adjustment of date and time counted by the time counting circuit 52 according to the leap second implementation. The setting data includes local time setting information 42b each corresponding to a city or an area selected according to user's input operation to the operation member 47 or the position acquired by satellite positioning.

The local time setting information 42b includes a list of time zone information regarding selectable cities and areas, implementation/non-implementation of summer time, implementation period, shift time information when implementing summer time, information regarding the types of standard radio waves which can be received in the respective cities and areas, and such like that are stored so as to be associated with each other.

The RAM 43 provides working memory space to the CPU 41 and stores various temporary data and rewritable setting data which can be updated. The RAM 43 includes current position information 43a and leap second implementation information 43b.

The current position information 43a stores information regarding the current position which is selected by user's input operation to the operation member 47 or selected on the basis of positioning operation of the satellite radio wave receiving section 48, time zone information which is stored in the local time setting information 42b so as to be associated with the current position, summer time implementation information and information regarding the type of receivable standard radio wave. By the CPU 41 reading out information in a standard radio wave which can be received at the current position (that is, the current position is located within a geographical range where date and time information can be acquired from the standard radio wave), the standard radio wave to be periodically (for example, at 2 a.m. every day) received is set, or the date and time correction by receiving a radio wave from a GPS satellite is set without the above setting of standard radio wave.

The leap second implementation information 43b stores latest date and time information (acquisition history) and leap second correction information around the leap second adjustment possible timing, the latest date and time information regarding the latest date and time of acquisition of notice information regarding implementation/non-implementation of the leap second adjustment for the next leap second adjustment possible timing (implementation candidate timing; currently, 00:00:00 on January 1 and July 1 of the UTC date and time). Such information is a reference for determining whether to execute after-mentioned leap second notice information acquisition processing during the notice information acquisition period. The information is also read out at the leap second adjustment possible timing to be used for correcting the date and time counted by the time counting circuit 52, and is also used for updating leap second correction time 48a when first activating the satellite radio wave receiving section 48 after the leap second adjustment possible timing.

The display section 45 has a display screen and displays various information such as date and time information on the basis of a drive signal from the display driver 46. Though not especially limited, the display screen includes a segment type liquid crystal display (LCD). The display screen may be formed so as to display a reception success mark indicating that the counted and displayed date and time is based on the accurate date and time acquired from the latest radio wave reception. The radio timepiece may be an analog hand type timepiece which has a plurality of hands and a stepping motor for rotating the plurality of hands as the display section 45 and displays the date and time information and such like by the positions indicated by the plurality of hands. The radio timepiece may be a timepiece which uses both of the hand display and the digital display.

The operation member 47 includes a plurality of operation keys and push buttons. When any one of the operation keys and push buttons is operated, the operation member 47 receives the input operation by converting the input operation into an electrical signal and outputting the converted electrical signal as an input signal to the CPU 41. In addition to or instead of the operation keys and push buttons, the operation member 47 may include a crown, a touch sensor and such like to output an input signal corresponding to the operation content.

The user can select and set a city or an area corresponding to the current position by a predetermined input operation to the operation member 47.

The satellite radio wave receiving section 48 is a module for receiving a transmission radio wave from a positioning satellite by using the antenna A1 capable of receiving the transmission radio wave in a L1 band (1.57542 GHz for the positioning satellites according to GPS; hereinafter, the positioning satellites according to GPS including the GPS satellites and GPS complementary satellites such as QZSS satellite are collectively described as "GPS satellite"), and for reading and outputting date and time information and positional information by demodulating and decoding a signal (navigation message) from the radio wave. By the control signal from the CPU 41, the satellite radio wave receiving section 48 is operated by the power supply only when performing the reception operation and separately from the other components.

The satellite radio wave receiving section 48 includes a memory 481 such as a non-volatile memory and stores, as the leap second correction time 48*a* (leap second correction information), a shift amount (time difference; after-mentioned total value ΔTLS) generated by the leap second of date and time data of the satellite timepiece received from the GPS satellite. When the date and time data by the satellite timepiece (GPS timepiece) is acquired from the GPS satellite, the satellite radio wave receiving section 48 refers to the leap second correction time 48*a* to correct the data to the current date and time (UTC or local time of a local area) and outputs the date and time. Accordingly, the satellite radio wave receiving section 48 generally can calculate accurate date and time by receiving only the date and time information by the GPS timepiece without receiving the shift amount.

In a case where date and time information is acquired from a single GPS satellite, the satellite radio wave receiving section 48 approximates and appropriately corrects the delay amount corresponding to the transmission time (65 msec to 90 msec) from the GPS satellite to the reception point, thereby reduces the influence by the delay amount and outputs the date and time information.

The long wave receiver 49 receives the ground wave (standard radio wave) by using the antenna A2 receiving the radio wave (LF wave) in a low frequency band, and demodulates the time code signal from the received standard radio wave. The standard radio wave is an amplitude modulated wave (AM wave) in the low frequency band. Though not especially limited, the long wave receiver 49 in the embodiment performs demodulation by superheterodyne system, for example. The long wave receiver 49 is configured to receive power supply from the power supply section 54 only when receiving the standard radio wave by a control signal from the CPU 41. The tuning frequency by the antenna A2 can be changed according to the transmission frequency of a standard radio wave transmitter station which is the reception target by adjusting the setting of tuning circuit (not shown in the drawings) in the long wave receiver 49.

The oscillation circuit 50 outputs an oscillation signal of a predetermined frequency, for example, about 32 kHz. Though not especially limited, the oscillation circuit 50 includes a compact crystal oscillator with low cost and low power consumption not having a temperature compensation circuit, for example.

The frequency dividing circuit 51 divides the oscillation signal to generate a necessary frequency signal and outputs the signal. By the control signal from the CPU 41, the frequency dividing circuit 51 can appropriately switch the dividing ratio to output signals of different frequencies.

The time counting circuit 52 counts the current date and time by adding the elapsed time to the setting date and time acquired from RTC (Real Time Clock) or the like on the basis of the predetermined frequency signal which was input from the frequency dividing circuit 51. The date and time counted by the time counting circuit 52 is rewritten and corrected by the control signal from the CPU 41 on the basis of data acquired from the GPS satellite and standard radio wave.

The light amount sensor 53 is provided by parallel arrangement on the display screen of the display section 45, for example, and measures the amount of light emitted from outside. As the light amount sensor 53, a photodiode is used, for example. The light amount sensor 53 outputs an electric signal (voltage signal and current signal) corresponding to the incident light amount, and the electric signal is sampled in an ADC (analog-digital convertor) not shown in the drawings and input to the CPU 41.

The power supply section 54 supplies electric power necessary for operating the sections in the radio timepiece 1 from the battery 54*a* to the sections. The battery 54*a* such as a button type primary cell is provided to the power supply section 54 so as to be attachable and detachable. The preferable battery 54*a* is mainly a battery which is compact and light and can continuously and stably supply electric power for a long time in a low-load use. Accordingly, it is desirable that the satellite radio wave receiving section 48 having excessively large power consumption in the radio timepiece 1 is operated for a short time with a sufficient interval.

Next, the navigation message received from the GPS satellite will be described.

Figure 2:
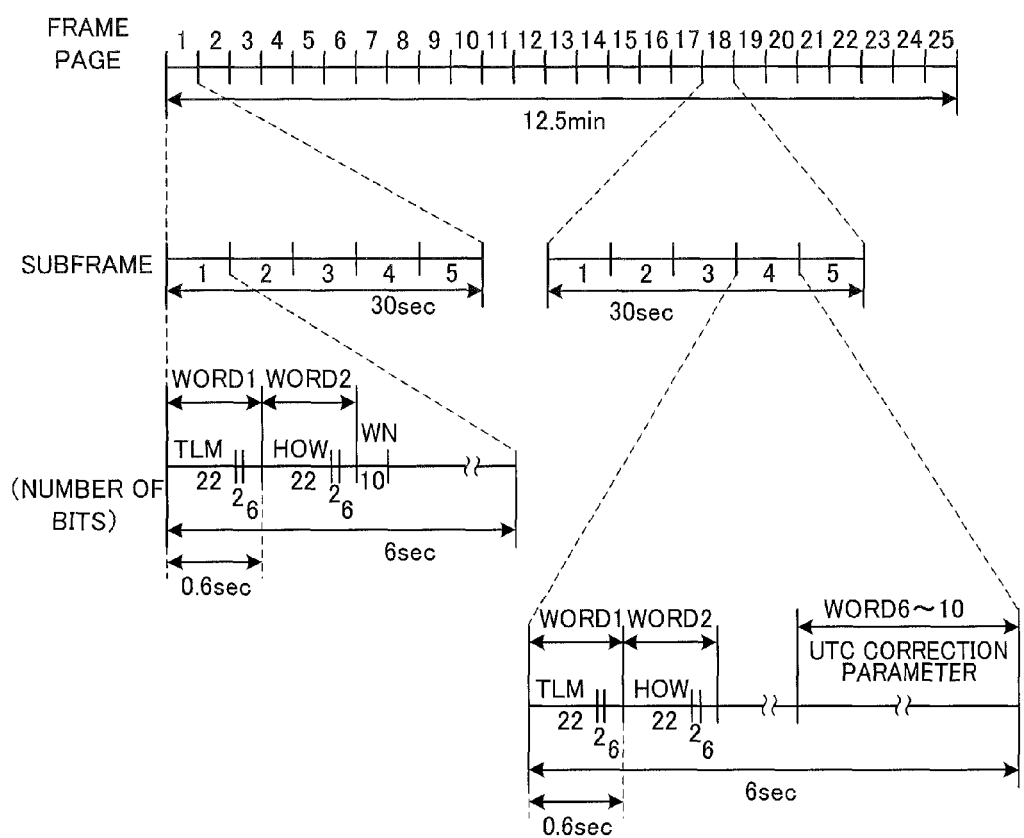
FIG. 2 is a view for explaining a format of a navigation message transmitted from a GPS satellite.

FIG. 2 is a view for explaining a format of the navigation message transmitted from the GPS satellite.

The navigation message transmitted from the GPS satellite is formed of frame data having a total of 25 pages, and the transmission time for each of the pages is 30 seconds. Each frame (page) is formed of five pieces of subframe data (each 6 seconds, 1500 bit), and each piece of subframe data is formed of 10 words (each 0.6 seconds, 300 bit). Accordingly, the navigation message is transmitted with a period of 12.5 minutes.

The word 1 in each of all the subframes contains TLM (Telemetry Word), and the head position of subframe is identified by a preamble which is a fixed code string contained in head of the TLM. The HOW (handover words) is transmitted via the word 2. The HOW contains a TOW-count (also referred to as a Z count) and a subframe ID, the TOW-count indicating the elapsed time within a week from 0 o'clock of Sunday. The subframe ID indicates a subframe among the five subframes in the page.

In each of all the pages, the word 3 of subframe 1 contains a WN (week number). The WN indicates the number of week starting from Jan. 6, 1980, the number being periodically counted by 10 bit. That is, by acquiring data of one frame (five subframes), the data of WN and HOW is surely acquired. Here, in a case where the shift of date and time counted by the time counting circuit 52 is estimated to be sufficiently small with respect to the time width indicated by the HOW, that is, 1 week, the current date and time can be obtained on the basis of the HOW data and the date and time in the time counting circuit 52 even if the WN is not acquired. In this case, the HOW data may be acquired from any subframe.

Accordingly, in the radio timepiece 1, the date and time information is acquired by receiving data for the amount of one to five subframe (s) as needed.

After the word 3 of subframes 2 and 3, ephemeris data is transmitted, the ephemeris data being orbit information of GPS satellite which is the transmission source of the navigation message. After a part of subframe 4 and word 3 of subframe 5, almanac data regarding predicted orbits of all the GPS satellites are divided in respective pages and sequentially transmitted together with IDs of the respective satellites.

By another part of the subframe 4, information regarding data status of satellite is transmitted. The information contains the UTC correction parameter in words 6 to 10 on the page 18. That is, the UTC correction parameter can be acquired only at the transmission timing of subframe 4 once for the 25 pages.

As described above, the date and time (satellite date and time) of satellite timepiece counted by each GPS satellite is the date and time starting from Jan. 6, 1980, and the implementation of leap second adjustment is not reflected on the date and time. Accordingly, a time difference is generated between the satellite date and time and the UTC date and time for the amount of total value of leap seconds which have been inserted by the leap second adjustment implemented after Jan. 6, 1980. In addition to the current total value of leap seconds ΔTLS, the UTC correction parameter includes the scheduled week number WNLSF and date number DN of leap second adjustment in a case where the implementation schedule of next leap second adjustment is determined, and an estimated value ΔTLSF of the total value after the implementation of leap second adjustment (change schedule information, notice information). Accordingly, the satellite radio wave receiving section 48 corrects (performs subtraction to) the calculated GPS date and time by the total value ΔTLS to output the obtained value as the current UTC date and time. Once the UTC correction parameter is acquired, the leap second total value ΔTLS can be continuously used until the next implementation of leap second adjustment. On the other hand, when the leap second adjustment is implemented, the total value ΔTLS needs to be updated.

Next, the date and time information transmitted by a standard radio wave will be described.

The standard radio wave mainly includes JJY (registered trademark) in Japan, WWVB in US, MSF in UK, DCF 77 in Germany and such like. By each of these standard radio waves, date and time information of every minute is transmitted with a period of 1 minute from a transmitter station. The date and time information is encoded in a predetermined format for each standard radio wave, and the code string is synchronized with the head of each second as time code, and transmitted by one code every second. When receiving the standard radio wave, generally, the code arrangement is identified after the head timing of second (second synchronization point) is identified, and the code arrangement is decoded to acquire the date and time information.

In such standard radio waves, 1 second is inserted or deleted in real time when the leap second adjustment is implemented. Accordingly, in the radio timepiece 1, it is possible to acquire accurate date and time applying leap second correction in the time zone (UTC in the WWVB) corresponding to each transmitter station by receiving the standard radio wave and decoding or reading the radio wave on the basis of the format of time code for the transmitter station. When receiving, demodulating and decoding the standard radio wave, various known techniques for improving reading accuracy can be applied. When acquiring date and time by receiving a standard radio wave, it is generally preferable to receive the radio wave for more than two periods (two minutes) to confirm consistency and thereafter correct the current date and time on the basis of the received date and time.

The time codes of JJY, WWVB and DCF 77 among the standard radio waves contain notice information regarding implementation/non-implementation of the leap second adjustment. In JJY, information indicating any one of the insertion, deletion of leap second and the non-implementation of adjustment is transmitted at 2 bit. In a case where the insertion or deletion of leap second is scheduled to be implemented, the output is changed to the 2-bit value corresponding to the insertion or deletion from 9:00 on the $2^{nd}$ day (JST) of the previous month of leap second adjustment possible timing for the scheduled adjustment (transmission start timing of schedule information) to the leap second adjustment possible timing. In the time codes of WWVB and DCF 77, the notice information indicating implementation/non-implementation of the leap second adjustment is transmitted at 1 bit. In a case where the leap second adjustment is scheduled, the 1-bit value is changed approximately from 00:00 on the $1^{st}$ day of the previous month of the leap second adjustment possible timing for the scheduled adjustment in WWVB and changed 1 hour before in the time code of DCF 77. Currently, only the 1-second insertion is performed as leap second adjustment, and, by acquiring the notice information, it is substantially possible to determine whether the 1-second insertion is to be performed at the next leap second adjustment possible timing.

Nest, acquisition operation of the implementation information regarding leap second adjustment to be implemented in the radio timepiece 1 of the embodiment will be described.

In the radio timepiece 1 of the embodiment, a notice information acquisition period is set from approximately 1 month before the leap second adjustment possible timing to the leap second adjustment possible timing, the approximately 1 month before the leap second adjustment possible timing being a timing of possibly starting the transmission of notice information indicating the leap second adjustment implementation via the standard radio wave. During the notice information acquisition period, acquisition operation of the notice information regarding implementation/non-implementation of the leap second adjustment is performed at a predetermined frequency, for example, once or twice a day until the notice information is acquired. The approximately 1 month before the leap second adjustment possible timing is a timing when the notice information of leap second adjustment generally can be surely acquired in either standard radio wave of JJY and WWVB, and the timing is, for example, 00:00 on the $3^{rd}$ day of the previous month of leap second adjustment possible timing.

The leap second adjustment possible timing is currently set every six months at the UTC date and time, that is, before 00:00 on each of July 1 and January 1 every year. However, for a case of increasing the frequency in the future, the leap second adjustment possible timing can be additionally set before 00:00 on April 1 and October 1 (every three months) and further on the $1^{st}$ day of each month (every month). Following this, the radio timepiece 1 is capable of changing the setting of frequency according to user's input operation to the operation member 47. The notice information acquisition period may be set every month by assuming that the leap second adjustment possible timing is set every month from the start.

In the radio timepiece in the first embodiment, during the notice information acquisition period, the notice information is first acquired from the standard radio wave until after a reference day, for example, reference date and time (such as 24:00 on the 23th day or 24:00 on the $24^{th}$ day) 1 week before the leap second adjustment possible timing. When it is confirmed that the leap second adjustment is scheduled to be implemented, an estimated value ΔTLSF after the implementation of leap second is acquired from the GPS satellite. In addition, when the notice information cannot be acquired from the standard radio wave until after the reference day, the notification information of leap second adjustment is acquired from the GPS satellite.

FIG. 3 is a flow chart showing a control procedure of leap second notice information acquisition processing executed by the CPU 41 in the radio timepiece 1 in the first embodiment.

The leap second notice information acquisition processing is activated at a predetermined timing and/or a timing satisfying a predetermined condition every day within the notice information acquisition period in a case where notice information regarding implementation/non-implementation of leap second adjustment has not yet been acquired within the notice information acquisition period.

When the leap second notice information acquisition processing is started, the CPU 41 performs area determination operation for determining whether the current position set as the current position information 43a is located within any one of the reception areas of standard radio waves (here, JJY and WWVB) containing the notice information of leap second adjustment (step S101). If it is not determined that the current position is located within any one of the reception areas of standard radio waves containing the notice information of leap second adjustment (step S101: NO), the CPU 41 shifts the processing to step S104.

If it is determined that the current position is located within any one of the reception areas of standard radio waves containing the notice information of leap second adjustment (step S101: YES), the CPU 41 operates the long wave receiver 49 to receive the standard radio wave of the reception area (step S102). The CPU 41 determines whether the reception of standard radio wave was successful (step S103). If it is not determined that the reception was successful (if it is determined that the reception was failed) (step S103: NO), the CPU 41 shifts the processing to step S104.

When the processing is shifted from the determination processing of step S101 or step S103 to the processing of step S104, the CPU 41 determines whether the remaining time until the leap second adjustment possible timing is less than a reference value (here, 1 week) (step S104). If it is not determined that the remaining time is less than the reference value (step S104: NO), the CPU 41 ends the leap second notice information acquisition processing. If it is determined that the remaining time is less than the reference value (step S104: YES), the CPU 41 shifts the processing to step S107.

In the determination processing of step S103, if it is determined that the reception of standard radio wave was successful (step S103: YES), the CPU 41 determines whether the leap second adjustment corresponding to this notice information acquisition period is scheduled to be implemented on the basis of the reception result (step S105). If it is not determined that the leap second adjustment is scheduled to be implemented (step S105: NO), the CPU 41 shifts the processing to step S110.

If it is determined that the leap second adjustment is scheduled to be implemented (step S105: YES), the CPU 41 shifts the processing to step S107.

When the processing is shifted from the determination processing of step S104 or S105 to step S107, the CPU 41 starts receiving a radio wave from the GPS satellite, and acquires the UTC correction parameter (step S107). In this case, the reception of radio wave from GPS satellite may not be immediately started, and the CPU 41 may be standby until an appropriate timing to receive the radio wave from GPS satellite. Further, it is preferable that the reception start timing is set to be the timing (for example, 3 seconds before) which is estimated to be immediate before the reception period of subframe 4 on page 18 on the basis of the current date and time counted by the time counting circuit 52.

The CPU 41 determines whether the leap second adjustment is scheduled to be implemented on the basis of the acquired UTC correction parameter (step S108). If it is determined that the leap second adjustment is scheduled to be implemented (step S108: YES), the CPU 41 sets the implementation scheduled date and the estimated value ΔTLSF after implementation of leap second adjustment (step S109). The CPU 41 shifts the processing to step S110. In the determination processing of step S108, if it is not determined that the leap second adjustment is scheduled to be implemented (step S108: NO), the CPU 41 shifts the processing to step S110.

When the processing is shifted from step S105, S108 or S109 to step S110, the CPU 41 updates a setting history regarding implementation/non-implementation of leap second adjustment (step S110). The CPU 41 acquires the current date and time information counted by the time counting circuit 52, and stores the acquired current date and time information as latest setting date and time in the leap second implementation information 43b. Then, the CPU 41 ends the leap second notice information acquisition processing.

FIG. 4 is a flowchart showing a control procedure of leap second adjustment processing executed by the CPU 41 in the radio timepiece 1 in the first embodiment.

The leap second adjustment processing is activated immediately before, for example, 1 second before the leap second adjustment possible timing.

The CPU 41 refers to the leap second implementation information 43b and determines whether the leap second adjustment is scheduled at this leap second adjustment possible timing (step S201). If it is not determined that the leap second adjustment is scheduled (step S201: NO), the CPU 41 ends the leap second adjustment processing.

If it is determined that the leap second adjustment is scheduled (step S201: YES), the CPU 41 corrects the date and time counted by the time counting circuit 52 (step S502). In a case where the display section 45 is capable of digital display of 60 seconds, the CPU 41 outputs a control signal to the display driver 46 to insert the display of 60 seconds after the display of 59 seconds. In a case where the display section 45 performs analog display by separately driving the hour and minute hands and the second hand, the CPU 41 outputs a control signal to the display driver 46 (drive circuit of stepping motor) to first move the second hand to the position of 0 second without moving the hour and minute hands to the hour position, and at the next second, to move the hour and minute hands to the hour position without moving the second hand.

The CPU 41 updates the total value $\Delta$TLS with the estimated value $\Delta$TLSF, the total value $\Delta$TLS being stored in the leap second correction time 48a of the satellite radio wave receiving section 48 (step S203). The processing does not need to be performed immediately after the implementation of leap second adjustment. The CPU 41 may set the processing to be performed at the timing when the satellite radio wave receiving section 48 is activated next. The CPU 41 also updates the total value $\Delta$TLS with the estimated value $\Delta$TLSF, the total value $\Delta$TLS being stored in the leap second implementation information 43b, and deletes the estimated value $\Delta$TLSF and implementation scheduled date and time (step S204).

Then, the CPU 41 ends the leap second adjustment processing.

As described above, the radio timepiece 1 in the first embodiment includes a satellite radio wave receiving section 48 which receives a radio wave from a positioning satellite according to GPS such as a GPS satellite and a QZSS satellite, a long wave receiver 49 which receives a radio wave in a low frequency band, a memory 481 which stores a leap second correction time 48a regarding a time difference between the counted date and time of positioning satellite and the UTC date and time, the time difference being generated by the implementation of leap second adjustment, and a CPU 41. The CPU 41 performs area determination operation of determining whether the current position is located within a geographical range where the long wave receiver 49 can acquire the notice information regarding implementation/non-implementation of leap second adjustment. If it is determined that the current position is located within a geographical range where the long wave receiver 49 can acquire the notice information, the CPU 41 controls the long wave receiver 49 to acquire the notice information of leap second adjustment, and determines, with the notice information, whether the leap second adjustment is scheduled to be implemented at the implementation candidate timing of leap second adjustment. If it is determined that the leap second adjustment is scheduled to be implemented, the CPU 41 changes the leap second correction information at or after the implementation candidate timing of leap second adjustment.

In such way, in a case where the notice information regarding implementation/non-implementation of leap second adjustment can be acquired by receiving the standard radio wave having small power consumption compared to the reception of satellite radio wave, the leap second adjustment is performed by receiving the standard radio wave. Thus, it is not necessary to receive the UTC correction parameter at every leap second adjustment possible timing, and it is possible to grasp and reflect the implementation/non-implementation of leap second adjustment efficiently with reduced power consumption.

If it is determined that the leap second adjustment is scheduled to be implemented, the CPU 41 controls the satellite radio wave receiving section 48 to receive the UTC correction parameter of the leap second correction information. That is, in a case where the notice information of leap second adjustment can be acquired by the standard radio wave, the reception of UTC correction parameter is performed only when it is clarified that the leap second adjustment is scheduled to be implemented by reception of the standard radio wave. Thus, the latest total value $\Delta$TLS and estimated value $\Delta$TLSF can be surely acquired with minimum reception.

The CPU 41 acquires the notice information regarding a leap second adjustment possible timing from the transmission start timing of notice information to the leap second adjustment possible timing for each of the leap second adjustment possible timings. That is, by surely acquiring the notice information from the standard radio wave each time there is possibility of implementing leap second adjustment, it is possible to prevent the skip of acquisition and maintain appropriate total value $\Delta$TLS and estimated value $\Delta$TLSF.

If it is not determined that the current position is located within the geographical range where the long wave receiver 49 can acquire the notice information after the transmission start timing of notice information, the CPU 41 repeats the area determination operation until after reference date and time which is set between the transmission start timing of notice information and the leap second adjustment possible timing. That is, even in a case where the user is temporarily at a position where the standard radio wave cannot be received, the processing does not immediately shift to the reception of UTC correction parameter, and the CPU 41 continuously waits for change to the situation allowing reception of the standard radio wave in consideration of the possibility of user's movement until the reference day. Thus, it is possible to reduce the necessity of receiving UTC correction parameter to a minimum.

If it is continuously determined that the current position is not within the geographical range where the long wave receiver 49 can acquire the notice information in the area determination operation until after the reference date and time, the CPU 41 controls the satellite radio wave receiving section 48 to acquire the notice information (that is, UTC correction parameter). Accordingly, with the minimum reception of UTC correction parameter, it is possible to avoid the situation of finally not acquiring the schedule regarding implementation/non-implementation of the leap second adjustment by the leap second adjustment possible timing.

The radio timepiece 1 further includes an operation member 47 which receives user's input operation, and the information regarding the current position can be set on the basis of a predetermined input operation to the operation member 47. The current position information is also necessary for setting the local time and such like in addition to determining the reception area of standard radio wave. Thus, by allowing the user to perform setting with the operation member 47, the reception area of standard radio wave can be determined as long as the user performs position setting corresponding to the current position.

When the notice information regarding implementation/non-implementation of leap second adjustment is acquired, the CPU 41 stores the acquisition date and time of the notice information as an acquisition history in the RAM 43.

As described above, by holding the acquisition history, it is possible to prevent the notice information from being received a plurality of times within the notice information acquisition period corresponding to one leap second adjustment possible timing, and it is also possible to confirm that the latest value is appropriately obtained, which assures an appropriate change from GPS date and time to the UTC date and time or local time within the next notice information acquisition period, for example.

By confirming the implementation/non-implementation of leap second adjustment by the above-described method for acquiring the leap second correction information and appropriately acquiring the total value ΔTLS and estimated value ΔTLSF, it is possible to surely acquire the date and time information reflecting the leap second and achieve the reduction in power consumption. Thus, the operation efficiency of radio timepiece can be improved.

It is also possible to easily and surely improve the operation efficiency of radio timepiece by installing the program 42a for confirming the implementation/non-implementation of leap second adjustment and updating the setting of total value ΔTLS and estimated value ΔTLSF to make the CPU 41 execute the program 42a.

Second Embodiment

Next, a radio timepiece 1 in a second embodiment will be described.

The functional configuration of the radio timepiece 1 in the second embodiment is same as that of the radio timepiece 1 in the first embodiment, and the explanation thereof is omitted by using the same reference numerals.

Next, acquisition operation of leap second notice information in the radio timepiece 1 in the second embodiment will be described.

In the radio timepiece 1 in the second embodiment, even in a case where it is confirmed that the leap second adjustment is scheduled to be implemented by receiving the standard radio wave, the total value ΔTLS is updated at leap second adjustment implementation timing according to the acquisition result of standard radio wave without receiving a radio wave from a GPS satellite when the current total value ΔTLS is appropriately held.

FIG. 5 is a flowchart showing a control procedure of leap second notice information acquisition processing executed by the CPU 41 in the radio timepiece 1 in the second embodiment.

The leap second notice information acquisition processing is different from that of the first embodiment only in that the processing of steps S126 and S127 is added. Thus, same reference numerals are provided to the same processing contents and the explanation thereof is omitted.

In the determination processing of step S105, if it is determined that the leap second adjustment is scheduled to be implemented on the basis of received contents of standard radio wave (step S105: YES), the CPU 41 determines whether the total value ΔTLS of the current period is held (step S126). The CPU 41 refers to the leap second implementation information 43b to determine, for example, whether the latest setting date and time is within the previous notice information acquisition period, and thereby determines whether the total value ΔTLS reflecting the implementation/non-implementation of leap second adjustment at the previous leap second adjustment possible timing is held (that is, whether the total value ΔTLS of current period is held). If it is not determined that the total value ΔTLS of current period is held (step S126: NO), the CPU 41 shifts the processing to step S107.

If it is determined that the total value ΔTLS of the current period is held (step S126: YES), the CPU 41 updates the leap second implementation information 43b, sets the estimated value ΔTLSF to be the value obtained by adding 1 to the current total value ΔTLS and sets the implementation scheduled date and time of leap second adjustment (step S127). Then, the CPU 41 shifts the processing to step S110.

As described above, in the radio timepiece 1 in the second embodiment, the CPU 41 determines whether the leap second adjustment is scheduled to be implemented at the implementation candidate timing of leap second adjustment and the leap second correction information before change by the implementation of leap second adjustment is stored as the leap second implementation information 43b in the RAM 43. If it is determined that the leap second adjustment is scheduled to be implemented and leap second correction information before change by the implementation of leap second adjustment is stored, the CPU 41 changes the leap second correction information by adding 1 to the total value ΔTLS on the basis of the notice information after the leap second adjustment was implemented.

By surely holding the latest total value ΔTLS, it is possible to change or update the total value ΔTLS without receiving the UTC correction parameter even when the leap second adjustment is scheduled to be implemented. Thus, the operation efficiency can be improved by reducing the frequency of receiving a satellite radio wave.

The present invention is not limited to the above embodiments, and various changes can be made.

For example, the embodiments have been described by taking a case of performing acquisition of notice information of leap second adjustment separately from the general date and time acquisition. However, the acquisition of notice information may be performed in parallel with the reception of radio wave for acquiring the general date and time information.

In the embodiments, both of the memory 481 of the satellite radio wave receiving section and the RAM 43 are used as a memory. However, a common memory may be used as the memory.

In the embodiments, the UTC correction parameter is not received from the satellite radio wave until after the reference date and time even when the timepiece has been continuously unable to receive the standard radio wave. However, the present invention is not limited to this, and for example, the UTC correction parameter may be received immediately when the current position is out of the reception possible range of JJY and WWVB. The reception of UTC correction parameter by receiving the satellite radio wave may not be performed until after the reference date and time only in a case where, despite the setting of home city located within the reception possible range of JJY and WWVB, the current position determined by the GPS positioning is different or the setting of city according to the time to be displayed is temporarily changed.

In the embodiments, the timepiece holds information indicating the standard radio wave of the reception area so as to be associated with positional information set according to the local time setting such as time zone, and performs area determination operation on the basis of the information. However, the present invention is not limited to this. Whether the current position is located in the reception area may be simply determined by a result of attempts to receive standard radio waves.

In the embodiments, the CPU 41 as a processor performs processing regarding acquisition operation control of correction information regarding leap second adjustment. However, the processor is not limited to a single CPU 41. A plurality of CPUs may perform distributed processing, or hardware such as a dedicated logic circuit may execute a part or all of the control operations and arithmetic operations.

The embodiments have been described by taking, as an example, the ROM 42 as computer readable recording medium storing the program 42a regarding acquisition of leap second notice information of the present invention. However, the present invention is not limited to this. As other computer readable recording media, various non-volatile memories such as a flash memory and an EEPROM (Electrically Erasable and Programmable Read Only Memory), an HDD (Hard Disk Drive), a portable recording medium such as a CD-ROM and a DVD disk can be applied. Also, as a medium providing program data according to the present invention via a communication line, carrier wave can also be applied to the present invention.

The other details such as specific configurations, control procedures and display examples shown in the embodiments can be appropriately changed within the scope of the present invention.

Though several embodiments of the present invention have been described above, the scope of the present invention is not limited to the above embodiments, and includes the scope of inventions, which is described in the scope of claims, and the scope equivalent thereof.

The entire disclosure of Japanese Patent Application No. 2016-059454 filed on Mar. 24, 2016 including description, claims, drawings, and abstract are incorporated herein by reference in its entirety.

What is claimed is:

1. A radio timepiece, comprising:
a satellite radio wave receiver which receives a radio wave from a positioning satellite;
a ground wave receiver which receives a radio wave in a low frequency band;
a memory which stores leap second correction information regarding a time difference between counted date and time of the positioning satellite and UTC date and time, the time difference being generated by implementation of leap second adjustment; and
a controller, wherein
the controller performs area determination operation of determining whether a current position is located within a geographical range where the ground wave receiver is capable of acquiring notice information regarding implementation/non-implementation of the leap second adjustment,
when the controller determines that the current position is located within the geographical range where the ground wave receiver is capable of acquiring the notice information, the controller controls the ground wave receiver to acquire the notice information of the leap second adjustment,
the controller determines, with the notice information, whether the leap second adjustment is scheduled to be implemented at an implementation candidate timing of the leap second adjustment, and
when the controller determines that the leap second adjustment is scheduled to be implemented, the controller changes the leap second correction information at or after the implementation candidate timing of the leap second adjustment.

2. The radio timepiece according to claim 1, wherein the positioning satellite is a positioning satellite according to GPS.

3. The radio timepiece according to claim 1, wherein, when the controller determines that the leap second adjustment is scheduled to be implemented, the controller controls the satellite radio wave receiver to receive change schedule information of the leap second correction information.

4. The radio timepiece according to claim 2, wherein, when the controller determines that the leap second adjustment is scheduled to be implemented, the controller controls the satellite radio wave receiver to receive change schedule information of the leap second correction information.

5. The radio timepiece according to claim 1, wherein
the controller determines whether the leap second adjustment is scheduled to be implemented at the implementation candidate timing of the leap second adjustment and the leap second correction information before change by the implementation of the leap second adjustment is stored in the memory, and
when the controller determines that the leap second adjustment is scheduled to be implemented and the leap second correction information before change by the implementation of the leap second adjustment is stored, the controller changes the leap second correction information on the basis of the notice information after the leap second adjustment is implemented.

6. The radio timepiece according to claim 2, wherein
the controller determines whether the leap second adjustment is scheduled to be implemented at the implementation candidate timing of the leap second adjustment and the leap second correction information before change by the implementation of the leap second adjustment is stored in the memory, and
when the controller determines that the leap second adjustment is scheduled to be implemented and the leap second correction information before change by the implementation of the leap second adjustment is stored, the controller changes the leap second correction information on the basis of the notice information after the leap second adjustment is implemented.

7. The radio timepiece according to claim 1, wherein the controller acquires the notice information of the implementation candidate timing from a transmission start timing of the notice information to the implementation candidate timing for each implementation candidate timing of the leap second adjustment.

8. The radio timepiece according to claim 2, wherein the controller acquires the notice information of the implementation candidate timing from a transmission start timing of the notice information to the implementation candidate timing for each implementation candidate timing of the leap second adjustment.

9. The radio timepiece according to claim 3, wherein the controller acquires the notice information of the implementation candidate timing from a transmission start timing of the notice information to the implementation candidate timing for each implementation candidate timing of the leap second adjustment.

10. The radio timepiece according to claim 4, wherein the controller acquires the notice information of the implementation candidate timing from a transmission start timing of the notice information to the implementation candidate timing for each implementation candidate timing of the leap second adjustment.

11. The radio timepiece according to claim 5, wherein the controller acquires the notice information of the implementation candidate timing from a transmission start timing of the notice information to the implementation candidate timing for each implementation candidate timing of the leap second adjustment.

12. The radio timepiece according to claim 6, wherein the controller acquires the notice information of the implementation candidate timing from a transmission start timing of the notice information to the implementation candidate timing for each implementation candidate timing of the leap second adjustment.

13. The radio timepiece according to claim 1, wherein, when the controller determines that the current position is not located within the geographical range where the ground wave receiver is capable of acquiring the notice information after a transmission start timing of the notice information, the controller repeats the area determination operation until after reference date and time which is set between the transmission start timing of the notice information and the implementation candidate timing.

14. The radio timepiece according to claim 2, wherein, when the controller determines that the current position is not located within the geographical range where the ground wave receiver is capable of acquiring the notice information after a transmission start timing of the notice information, the controller repeats the area determination operation until after reference date and time which is set between the transmission start timing of the notice information and the implementation candidate timing.

15. The radio timepiece according to claim 3, wherein, when the controller determines that the current position is not located within the geographical range where the ground wave receiver is capable of acquiring the notice information after a transmission start timing of the notice information, the controller repeats the area determination operation until after reference date and time which is set between the transmission start timing of the notice information and the implementation candidate timing.

16. The radio timepiece according to claim 13, wherein, when the controller continuously determines that the current position is not located within the geographical range where the ground wave receiver is capable of acquiring the notice information in the area determination operation until after the reference date and time, the controller controls the satellite radio wave receiver to acquire the notice information.

17. The radio timepiece according to claim 1, further comprising an operation member which receives user's input operation, wherein information regarding the current position is set on the basis of a predetermined input operation to the operation member.

18. The radio timepiece according to claim 1, wherein, when the notice information regarding implementation/non-implementation of the leap second adjustment is acquired, the controller stores acquisition date and time of the notice information as an acquisition history in the memory.

19. A method for acquiring leap second correction information of a radio timepiece including: a satellite radio wave receiver which receives a radio wave from a positioning satellite; a ground wave receiver which receives a radio wave in a low frequency band; and a memory which stores the leap second correction information regarding a time difference between counted date and time of the positioning satellite and UTC date and time, the time difference being generated by implementation of leap second adjustment, the method comprising:
  determining whether a current position is located within a geographical range where the ground wave receiver is capable of acquiring notice information regarding implementation/non-implementation of the leap second adjustment,
  when determining that the current position is located within the geographical range where the ground wave receiver is capable of acquiring the notice information, controlling the ground wave receiver to acquire the notice information of the leap second adjustment,
  determining, with the notice information, whether the leap second adjustment is scheduled to be implemented at an implementation candidate timing of the leap second adjustment, and
  when determining that the leap second adjustment is scheduled to be implemented, changing and storing the leap second correction information at or after the implementation candidate timing of the leap second adjustment.

20. A non-transitory recording medium storing a program which is readable by a computer of a radio timepiece including: a satellite radio wave receiver which receives a radio wave from a positioning satellite; a ground wave receiver which receives a radio wave in a low frequency band; and a memory which stores leap second correction information regarding a time difference between counted date and time of the positioning satellite and UTC date and time, the time difference being generated by implementation of leap second adjustment, the program causing the computer to execute:
  determining whether a current position is located within a geographical range where the ground wave receiver is capable of acquiring notice information regarding implementation/non-implementation of the leap second adjustment,
  when determining that the current position is located within the geographical range where the ground wave receiver is capable of acquiring the notice information, controlling the ground wave receiver to acquire the notice information of the leap second adjustment,
  determining, with the notice information, whether the leap second adjustment is scheduled to be implemented at an implementation candidate timing of the leap second adjustment, and
  when determining that the leap second adjustment is scheduled to be implemented, changing and storing the leap second correction information at or after the implementation candidate timing of the leap second adjustment.

* * * * *